United States Patent
Khan et al.

(10) Patent No.: US 7,853,344 B2
(45) Date of Patent: Dec. 14, 2010

(54) METHOD AND SYSTEM FOR ANALYZING DITIGAL AUDIO FILES

(75) Inventors: Rehan M. Khan, Berkeley, CA (US); George Tzanetakis, Victoria (CA)

(73) Assignee: Rovi Technologies Corporation, Santa Clara, CA (US)

( * ) Notice: Subject to any disclaimer, the term of this patent is extended or adjusted under 35 U.S.C. 154(b) by 353 days.

(21) Appl. No.: 11/839,768

(22) Filed: Aug. 16, 2007

(65) Prior Publication Data

US 2007/0282935 A1 Dec. 6, 2007

Related U.S. Application Data

(63) Continuation of application No. 09/695,457, filed on Oct. 24, 2000, now Pat. No. 7,277,766.

(51) Int. Cl.
G06F 17/00 (2006.01)
G06F 15/18 (2006.01)
G06F 17/30 (2006.01)

(52) U.S. Cl. .................... 700/94; 707/737; 706/12

(58) Field of Classification Search .............. 700/94; 707/737; 706/12–14
See application file for complete search history.

(56) References Cited

U.S. PATENT DOCUMENTS

| | | | |
|---|---|---|---|
| 4,677,466 A | 6/1987 | Lert et al. ............... 725/22 |
| 4,843,562 A | 6/1989 | Kenyon et al. .......... 364/487 |
| 5,210,820 A | 5/1993 | Kenyon .................. 395/2 |
| 5,432,852 A | 7/1995 | Leighton et al. ......... 380/30 |
| 5,473,759 A * | 12/1995 | Slaney et al. ............ 704/266 |
| 5,612,729 A | 3/1997 | Ellis et al. .............. 725/22 |
| 5,825,830 A * | 10/1998 | Kopf ..................... 375/340 |
| 5,862,260 A | 1/1999 | Rhoads |
| 5,918,223 A | 6/1999 | Blum et al. |
| 5,960,388 A | 9/1999 | Nishiguchi et al. ...... 704/208 |
| 5,987,525 A | 11/1999 | Roberts et al. |
| 6,061,680 A | 5/2000 | Scherf et al. |
| 6,154,773 A | 11/2000 | Roberts et al. |

(Continued)

FOREIGN PATENT DOCUMENTS

WO 99/30488 6/1999

(Continued)

OTHER PUBLICATIONS

Tzanetaski, G., "Multifeature Audio Segmentation for Browing and Annotation", pp. W99-1-W99-4; Proc. 1999 IEEE Workshop on Applications of Signal Processing to Audio and Acoustics, New Paltz, New York, Oct. 17-20, 1999.

(Continued)

*Primary Examiner*—Vivian Chin
*Assistant Examiner*—Daniel R Sellers
(74) *Attorney, Agent, or Firm*—Fitzpatrick, Cella, Harper & Scinto

(57) ABSTRACT

A method and system for analyzing audio files is provided. Plural audio file feature vector values based on an audio file's content are determined and the audio file feature vectors are stored in a database that also stores other pre-computed audio file features. The process determines if the audio files feature vectors match the stored audio file vectors. The process also associates a plurality of known attributes to the audio file.

28 Claims, 7 Drawing Sheets

U.S. PATENT DOCUMENTS

| | | | |
|---|---|---|---|
| 6,161,132 A | 12/2000 | Roberts et al. | |
| 6,201,176 B1* | 3/2001 | Yourlo | 84/609 |
| 6,230,192 B1 | 5/2001 | Roberts et al. | |
| 6,230,207 B1 | 5/2001 | Roberts et al. | |
| 6,240,459 B1 | 5/2001 | Roberts et al. | |
| 6,304,523 B1 | 10/2001 | Jones et al. | |
| 6,321,200 B1* | 11/2001 | Casey | 704/500 |
| 6,330,593 B1 | 12/2001 | Roberts et al. | |
| 6,434,520 B1* | 8/2002 | Kanevsky et al. | 704/243 |
| 6,453,252 B1 | 9/2002 | Laroche | 702/75 |
| 6,463,433 B1* | 10/2002 | Baclawski | 707/5 |
| 6,505,160 B1 | 1/2003 | Levy et al. | |
| 6,512,796 B1 | 1/2003 | Sherwood | 374/242 |
| 6,539,395 B1 | 3/2003 | Gjerdingen et al. | 707/102 |
| 6,570,991 B1 | 5/2003 | Scheirer et al. | 381/110 |
| 6,571,144 B1 | 5/2003 | Moses et al. | 700/94 |
| 6,657,117 B2* | 12/2003 | Weare et al. | 84/668 |
| 6,675,174 B1 | 1/2004 | Bolle et al. | 707/104.1 |
| 6,826,350 B1* | 11/2004 | Kashino et al. | 386/46 |
| 6,829,368 B2 | 12/2004 | Meyer et al. | |
| 6,963,975 B1* | 11/2005 | Weare | 713/176 |
| 2002/0087565 A1* | 7/2002 | Hoekman et al. | 707/100 |
| 2002/0101989 A1 | 8/2002 | Markandey et al. | 380/210 |
| 2003/0028796 A1 | 2/2003 | Roberts et al. | |
| 2003/0046283 A1 | 3/2003 | Roberts | |
| 2003/0086341 A1 | 5/2003 | Wells et al. | |
| 2003/0135513 A1 | 7/2003 | Quinn et al. | |
| 2004/0074378 A1 | 4/2004 | Allamanche et al. | |
| 2004/0143349 A1 | 7/2004 | Roberts et al. | |
| 2004/0172411 A1 | 9/2004 | Herre et al. | |
| 2004/0267522 A1 | 12/2004 | Allamanche et al. | |
| 2005/0017879 A1 | 1/2005 | Linzmeier et al. | |

FOREIGN PATENT DOCUMENTS

| | | |
|---|---|---|
| WO | 01/20483 | 3/2001 |
| WO | 01/37465 | 5/2001 |
| WO | 02/065782 | 8/2002 |
| WO | 02/077966 | 10/2002 |
| WO | 02/093823 | 11/2002 |
| WO | 03/067466 | 8/2003 |
| WO | 03/096337 | 11/2003 |
| WO | 2004/044820 | 5/2004 |
| WO | 2004/077430 | 9/2004 |
| WO | 2004/081817 | 9/2004 |

OTHER PUBLICATIONS

U.S. District Court, Northern District of California, "First Amended Complaint for 1. Breach of Contracts, 2. Unfair Competition, 3. Trademark Infringement, 4. International Interference With Prospective Economic Advantage, 5. Negligent Interference With Prospective Economic Advantage, 6. Patent Infringement, Demand for Jury Trial", *Gracenote, Inc.* v. *MusicMatch, Inc.*, No. C 02-3162 CW, 08/21/022, 33 pages.

U.S. District Court, Northern District of California, "Stipulation and [Proposed] Order Re Dismissal of Adeptec, Inc.", *CDDB, Inc. dba Gracenot v. Adaptec, Inc., and Roxio, Inc.*, No. C-01 20428 JW, Dec. 31, 2001, 3 pages.

U.S. District court, Northern District of California, "Stipulation and [Proposed] Order re Dismissal of Roxio, Inc. and Gracenote", *CDDB, Inc. dba Gracenote v. Adaptec, Inc., and Roxio, Inc.*, No. C-01 20428 JW, Dec. 31, 2001, 5 pages.

U.S. District Court, Northern District of California, "Order Addressing Parties' Cross Motions for Summary Judgment Re: Patent Infringement", *Gracenote, Inc.* v. *MusicMatch, Inc.*, No. C-02 3162 CW, Aug. 26, 2004, 25 pages.

R. Venkatesan, S.M. Koon, M.H. Jakubowski and P. Moulin, "Robust Image Hashing", ICIP'00-IEEE International Conference on Image Processing, Vancouver, Sep. 10-13, 2000.

* cited by examiner

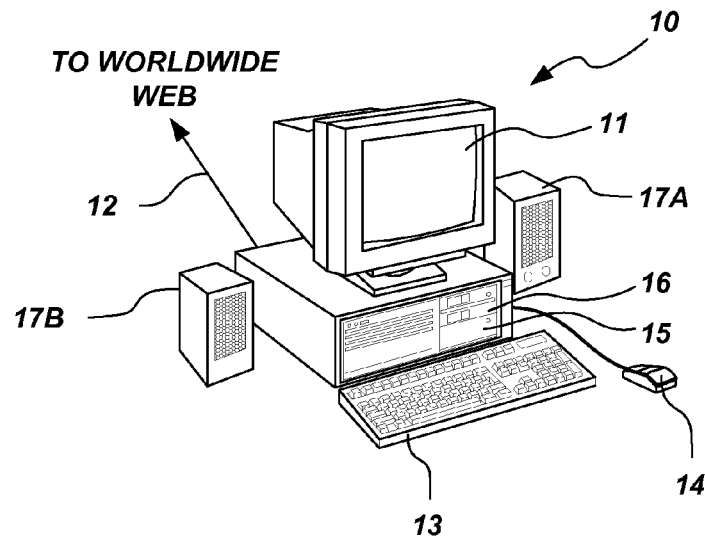
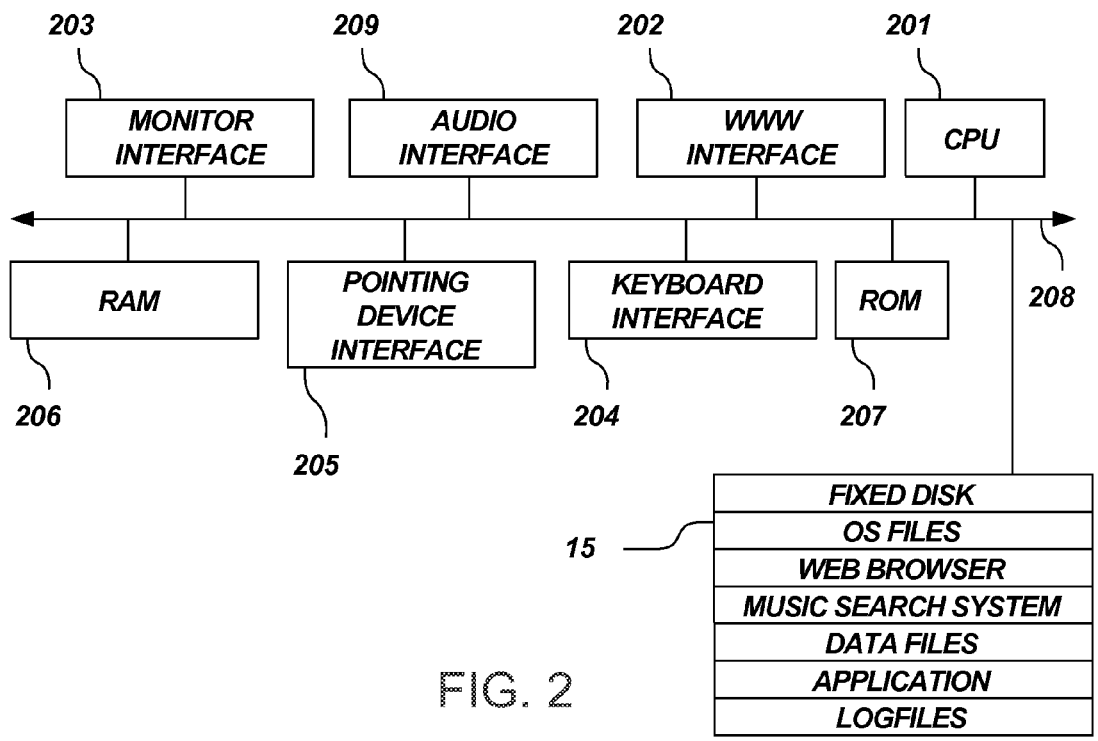
FIG. 1
FIG. 2

METHOD AND SYSTEM FOR ANALYZING DITIGAL AUDIO FILES

CROSS REFERENCE TO RELATED APPLICATION

This application is a Continuation of U.S. application Ser. No. 09/695,457, filed on Oct. 24, 2000, now U.S. Pat. No. 7,277,766, the contents of which are incorporated herein by reference in their entirety.

CROSS REFERENCE TO RELATED APPLICATIONS

The present Application is related to the U.S. patent application entitled "METHOD FOR CREATING A DATABASE FOR COMPARING MUSIC ATTRIBUTES", Ser. No. 09/533,045, Attorney Docket Number M-8292 US, filed on Mar. 22, 2000, and assigned to the Assignee of the present invention is hereby incorporated by reference in its entirety.

FIELD OF THE INVENTION

The present invention relates to analyzing audio files and more particularly to presenting a playlist based upon listener preferences and audio file content.

BACKGROUND

The Internet connects thousands of computers world wide into a vast network using well-known protocols, for example, Transmission Control Protocol (TCP)/Internet Protocol (IP). Information on the Internet is stored world wide as computer files, mostly written in the Hypertext Mark Up Language ("HTML"). The collection of all such publicly available computer files is known as the World Wide Web (WWW).

The WWW is a multimedia-enabled hypertext system used for navigating the Internet and is made up of hundreds of thousands of web pages with audio, images, text and video files. Each web page can have connections to other pages, which may be located on any computer connected to the Internet.

A typical Internet user uses a client program called a "Web Browser" to connect to the Internet. A user can connect to the Internet via a proprietary network, such as America Online or CompuServe, or via an Internet Service Provider, e.g., Earthlink.

A Web Browser may run on any computer connected to the Internet. Currently, various browsers are available of which two prominent browsers are Netscape Navigator and Microsoft Internet Explorer. The Web Browser receives and sends requests to a web server and acquires information from the WWW. A web server is a program that, upon receipt of a request, sends the requested data to the requesting user.

A standard naming convention known as Uniform Resource Locator ("URL") has been adopted to represent hypermedia links and links to network services. Most files or services can be represented with a URL. URLs enable Web Browsers to go directly to any file held on any WWW server.

Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

The advent and progress of the Internet has changed the way consumers buy or listen to music. Consumers today can download digital music via the Internet using MP3 or SDMI technology, with a click of a mouse. Audio delivery techniques have also made it easy to stream audio from a website to a consumer, upon demand. A typical music listener can download audio files from the WWW, store the audio files, and listen to music.

Currently music can be stored in various file formats. Generally there are two types of file formats: (1) self-describing formats, where device parameters and encoding are made explicit in a header, and (2) headerless formats, where device parameters and encoding are fixed.

The header of self-describing formats contain parameters of a sampling device and may also include other information (e.g. a human-readable description of sound, or a copyright notice etc.). Some examples of popular self describing formats are provided below:

| File Extension | Variable Parameters (fixed; comments) |
| --- | --- |
| au or .snd | rate, #channels, encoding, info string |
| aif(f), AIFF | rate, #channels, sample width, lots of info |
| aif(f), AIFC | same (extension of AIFF with compression) |
| iff, IFF/8SVX | rate, #channels, instrument info (8 bits) |
| mp2, .mp3 | rate, #channels, sample quality |
| .ra | rate, #channels, sample quality |
| .sf | rate, #channels, encoding, info |
| .smp | loops, cues, (16 bits/1 ch) |
| .voc | rate (8 bits/1 ch; can use silence deletion) |
| .wav, WAVE | rate, #channels, sample width, lots of info |

Headerless formats define single encoding and usually allow no variation in device parameters (except sometimes for sampling rates). The following are a few examples of Headerless formats:

| Extension | Parameters or name |
| --- | --- |
| .snd, .fssd | Variable rate, 1 channel, 8 bits unsigned |
| .ul | 8 k, 1 channel, 8 bit "u-law" encoding |
| .snd | Variable rate, 1 channel, 8 bits signed |

Although music listeners can store audio files, conventional music search techniques do not allow a music listener to search for music based upon audio file content. Conventional systems also do not allow a music listener to generate play lists based upon music listener preferences and/or audio file content.

Hence what is needed is a method and system that can analyze audio file content and produce a play list based upon preferences defined by a music listener.

SUMMARY

The present invention solves the foregoing drawbacks by providing a method and system for analyzing audio files. Plural audio file feature vector values based on an audio file's content are determined and the audio file feature vectors are stored in a database, that also stores other pre-computed audio file features. The process determines if the audio file's feature vectors match the stored audio file vectors. The process also associates a plurality of known attributes to the audio file.

The present invention includes a system for analyzing audio files that includes a playlist generator that determines a plurality of audio file vectors based upon an audio file's content; and a signature comparator between the playlist generator and a database, wherein the database stores a plurality of audio file vector values of plural music samples. The signature comparator compares input audio samples with previously stored audio samples in the database. Also provided is a user interface that allows a music listener to input search request for searching music based upon attributes that define music content.

In another aspect, the present invention includes a method for determining audio signatures for input audio samples. The process extracts plural features representing the input audio samples, wherein the features are extracted by Fourier transform analysis. The process also identifies a set of representative points based upon the plural features, and determines a code book of plural elements for mapping the representative points to the elements of the code book.

In yet another aspect, the present invention includes a method for comparing input audio signatures with pre-computed stored audio signatures. The process determines a query signature based upon the input audio signature and divides the query signature into a string of characters; and compares the string of characters to stored pre-computed audio signatures.

In yet another aspect, the present invention divides an input audio sample into bins and determines a plurality of features describing the bins. Thereafter, the process determines a univariate signal based upon the plural features and computes an audio signature based upon the univariate signal.

One advantage of the foregoing aspects of the present invention is that unique audio signatures may be assigned to audio files. Also various attributes may be tagged to audio files. The present invention can generate a customized playlist for a user based upon audio file content and the attached attributes, hence making the music searching experience easy and customized.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 1 illustrates a computing system to carry out the inventive technique.

FIG. 2 is a block diagram of the architecture of the computing system of FIG. 1.

The use of similar reference numerals in different figures indicates similar or identical items.

DESCRIPTION OF THE PREFERRED EMBODIMENTS

Figure 3:
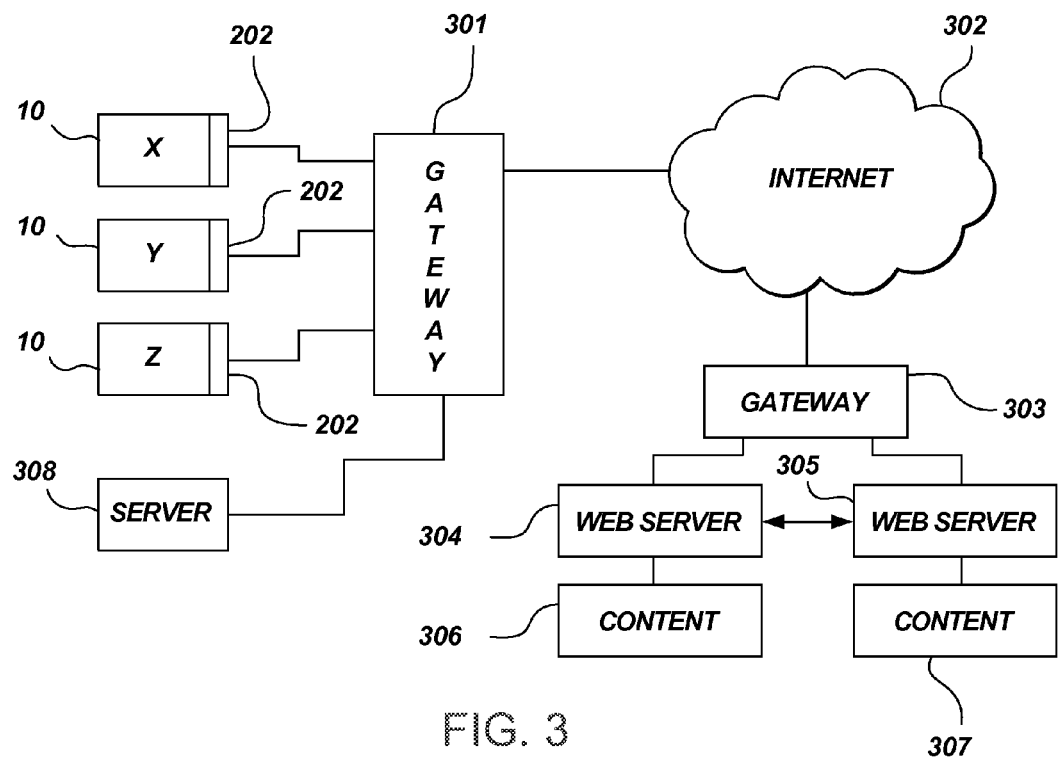
FIG. 3 is a block diagram of the Internet Topology.

FIG. 1 is a block diagram of a computing system for executing computer executable process steps according to one embodiment of the present invention. FIG. 1 includes a host computer 10 and a monitor 11. Monitor 11 may be a CRT type, a LCD type, or any other type of color or monochrome display. Also provided with computer 10 is a keyboard 13 for entering text data and user commands, and a pointing device 14 for processing objects displayed on monitor 11.

Computer 10 includes a computer-readable memory medium such as a rotating disk 15 for storing readable data. Besides other programs, disk 15 can store application programs including web browsers by which computer 10 connects to the Internet and the systems according to the present invention as described below.

Computer 10 can also access a computer-readable floppy disk storing data files, application program files, and computer executable process steps embodying the present invention or the like via a floppy disk drive 16. A CD-ROM interface (not shown) may also be provided with computer 10 to access application program files, audio files and data files stored on a CD-ROM.

A modem, an integrated services digital network (ISDN) connection, or the like also provides computer 10 with an Internet connection 12 to the World Wide Web (WWW). The Internet connection 12 allows computer 10 to download data files, audio files, application program files and computer-executable process steps embodying the present invention.

Computer 10 is also provided with external audio speakers 17A and 17B to assist a listener to listen to music either on-line, downloaded from the Internet or off-line using a CD (not shown). It is noteworthy that a listener may use headphones instead of audio speakers 17A and 17B to listen to music.

FIG. 2 is a block diagram showing the internal functional architecture of computer 10. Computer 10 includes a CPU 201 for executing computer-executable process steps and interfaces with a computer bus 208. Also shown in FIG. 2 are a WWW interface 202, a display device interface 203, a keyboard interface 204, a pointing device interface 205, an audio interface 209, and a rotating disk 15. Audio Interface 209 allows a listener to listen to music, On-line (downloaded using the Internet or a private network) or off-line (using a CD, not shown).

As described above, disk 15 stores operating system program files, application program files, web browsers, and other files. Some of these files are stored on disk 15 using an installation program. For example, CPU 201 executes computer-executable process steps of an installation program so that CPU 201 can properly execute application programs.

A random access main memory ("RAM") 206 also interfaces to computer bus 208 to provide CPU 201 with access to memory storage. When executing stored computer-executable process steps from disk 15 (or other storage media such as floppy disk 16 or WWW connection 12), CPU 201 stores and executes the process steps out of RAM 206.

Read only memory ("ROM") 207 is provided to store invariant instruction sequences such as start-up instruction sequences or basic input/output operating system (BIOS) sequences for operation of keyboard 13.

The present invention is not limited to the computer architecture described above. Systems comparable to Computer 10, for example, Portable devices or hand held computing devices that can be connected to the Internet may also be used to implement the present inventive techniques.

FIG. 3 shows a typical topology of a computer network with computers similar to computer 10, connected to the Internet. For illustration purposes, three computers X, Y and Z are shown connected to the Internet 302 via Web interface 202, through gateway 301, where gateway 301 can interface numerous computers. Web interface 202 may be a modem, network interface card or a unit for providing connectivity to other computer systems over a network using protocols such as X.25, Ethernet or TCP/IP, or to any device that allows direct or indirect computer-to-computer communications.

It is noteworthy that the invention is not limited to a particular number of computers. Any number of computers that can be connected to the Internet 302 or to any other computer network may be used to implement the present inventive techniques.

FIG. 3 further also shows a second gateway 303 that connects a network of web servers 304 and 305 to the Internet 302. Web servers 304 and 305 may be connected with each other over a computer network. Web servers 304 and 305 can provide content including music samples and audio clips to a user from database 306 and/or 307. Web servers 304 and 305 can also host the system according to the present invention. Also shown in FIG. 3 is a client side web server 308 that can be provided by an Internet service provider.

Figure 4:
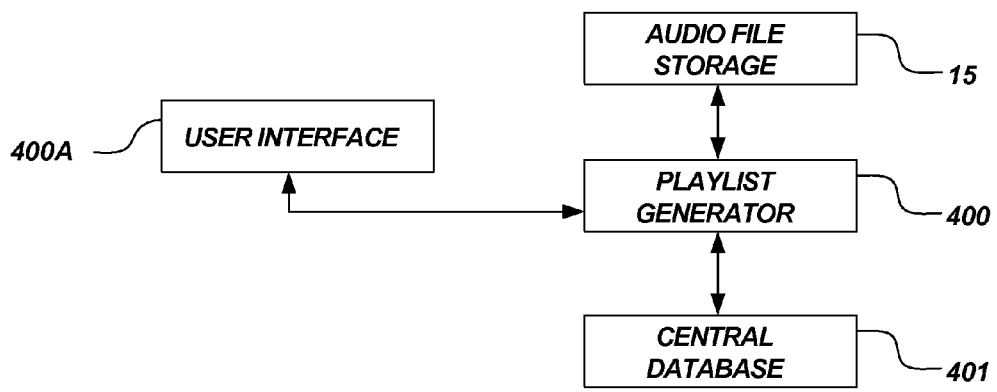
FIG. 4 is a block diagram of the architecture of the present system.

FIG. 4 shows a block diagram of a system used for analyzing audio files, according to the present invention. Audio files may be stored on rotating disk 15 in a music listener's computer 10, or at any remote computer 10 connected to the Internet 302.

A playlist generator 400 accesses audio files stored on rotating disk 15. Playlist generator 400 is an application program that can be located on remote server 304 or on a music listener's computer 10. Playlist generator 400 scans and analyzes audio files stored on rotating disk 15 and computes audio signatures that uniquely and compactly identify the content of the audio file. An audio signature is computed only once for each file and stored in a local database. The computed audio signature that compares the analyzed audio files with previously analyzed audio data is stored in a central database 401. Central database 401 stores a plurality of feature vector values as discussed below. Central database 401 also includes data similar to the data stored in a production database that is described in U.S. patent application Ser. No. 09/533,045, entitled, "Method for Creating a Database for Comparing Music Attributes", incorporated herein by reference in its entirety. Customized play lists are generated after audio file content is compared to the data stored in central database 401, as described below.

A user interface 400A is also provided that allows a music listener to input preferences for generating play lists. User interface 400A may be a separate component or integrated with playlist generator 400. One such user interface is described in U.S. patent application Ser. No. 09/533,045, entitled "Method for Creating a Database for Comparing Music Attributes", incorporated herein by reference in its entirety.

Figure 5:
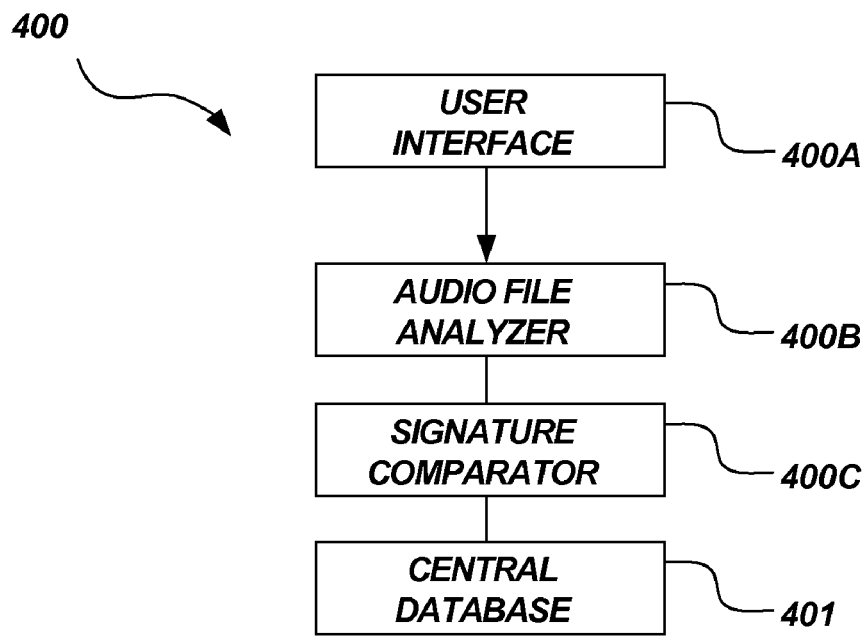
FIG. 5 is a block diagram showing the architecture of a playlist generator.

FIG. 5 is a block diagram showing various components of playlist generator 400. Playlist generator 400 includes an audio file analyzer 400B and a Signature Comparator 400C. Audio file analyzer 400B receives and analyzes audio files as described below. Audio files may be stored on rotating disk 15 or may be acquired from a remote computer.

The Signature Comparator 400C receives user requests from UI 400A and obtains music or a list of music based upon user preferences, as described below. It is noteworthy that audio file analyzer 400B and signature comparator 400C may be integrated into a single module to determine audio signature and implement the various aspects of the present invention.

Figure 6:
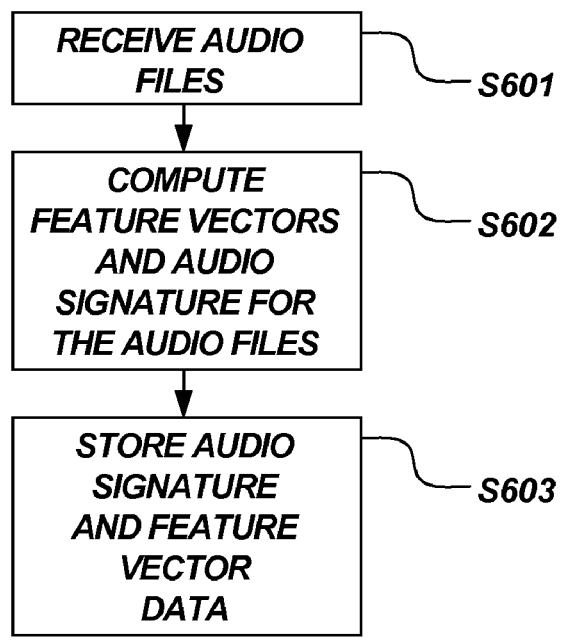
FIG. 6 is a flow diagram of computer executable process steps for analyzing an audio file.

FIG. 6 is a process flow diagram of computer executable process steps for analyzing audio files according to the present invention.

In step S601 audio analyzer 400B receives audio files ("input audio files"). Audio files may be stored on a user's disk 15 or at webserver 304 connected to the Internet or on any private network. Audio analyzer 400B may seek audio files based upon user input in UI 400A or may receive audio files from a designated source.

In step S602, audio analyzer 400B analyzes input audio file content and computes a set of parameters ("audio file vectors"). Audio file vectors can uniquely identify audio files and can also be used to assign a unique "audio signature" for an input audio file. Details of determining audio signatures are described below. These audio signatures need be computed only once for a given audio file and can thereafter be stored either locally or remotely and referred to as necessary.

Figure 6A:
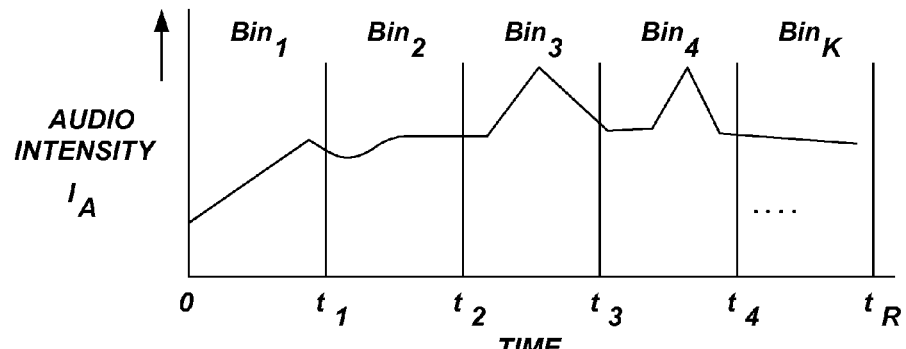
FIG. 6A is a graphical illustration of an audio file's content.

In step S603, input audio file vector values for specific bins and the audio signature are stored in a database. One such database is a central database 401. Audio file signatures are sets or vectors of values based upon the audio segments as shown in FIG. 6A.

Figure 7:
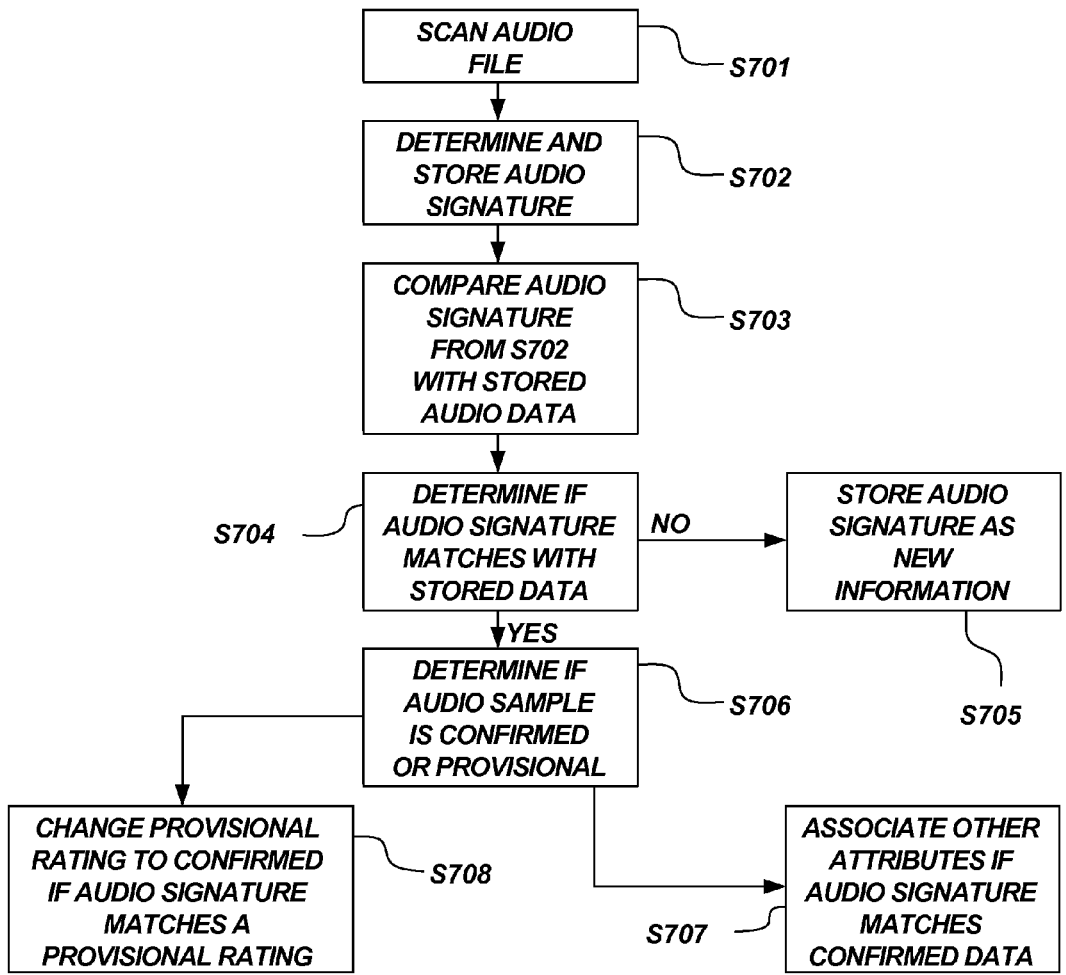
FIG. 7 is a flow diagram of computer executable process steps for comparing input audio files with stored audio data.

FIG. 7 is a flowchart of computer executable process steps that allows playlist generator 400 to compare audio file content with stored and analyzed audio file data. Such audio files may be stored on rotating disk 15 or on a remote computer.

In step S701, playlist generator 400 scans an audio file(s) stored on disk 15. Audio files may be pulled by playlist generator 400 from disk 15, or a music listener may send audio files to playlist generator 400 via the Internet 302 or a private network.

In step S702, playlist generator 400 determines the audio signature of input audio file(s). An audio signature may be determined by the process described below.

In step S703, playlist generator 400 transfers the audio signature and audio file vector values ($V_{t1} \ldots V_{tk}$) to Signature Comparator 400C. Playlist generator 400 also commands the Signature Comparator 400C to compare the audio signature and feature vectors values determined in step S702 with historical audio signatures and audio file vector values stored in central database 401. Thereafter, the Signature Comparator 400C compares input audio signature and audio file vector values with historical audio signatures and audio file vector values, stored in database 401.

In step S704, Signature Comparator 400C determines whether the input audio signature and audio file vectors values match stored audio signatures and vector values. If the input audio file vector values do not match with any stored audio data (audio signature and feature vector), then in step S705 input audio file vector values are stored in central database 401.

If the input audio file signature matches with stored audio signatures and vector values, then in step S706, the process determines if the stored entries are confirmed or provisional. A confirmed entry in database 401 is an entry that has been ratified by multiple sources.

A provisional entry in database 401 is one that is not confirmed.

If the input audio file matches a confirmed entry, then in step S707 other feature values stored in database 401 are associated with the audio file. Examples of such feature vectors are provided in U.S. patent application Ser. No. 09/533,045, entitled "Method for Creating a Database for Comparing Music Attributes", filed on Mar. 22, 2000, assigned to the assignee herein, and incorporated by reference in its entirety. Associating a plurality of feature vectors allows a listener to search for music based upon content. For example, feature values associated with a given audio file may indicate that it is Rock music with a slow tempo and a smooth, female singer accompanied by a band featuring a prominent saxophone.

Some of the features that can be associated with the audio files are:

(a) Emotional quality vector values that indicate whether an audio file content is Intense, Happy, Sad Mellow, Romantic, Heartbreaking, Aggressive or Upbeat.

(b) Vocal vector values that indicate whether the audio file content includes a Sexy voice, a Smooth voice, a Powerful voice, a Great voice, or a Soulful voice.

(c) Sound quality vector values that indicates whether the audio file content includes a strong beat, is simple, has a good groove, is fast, is speech like or emphasizes a melody.

(d) Situational quality vector values that indicate whether the audio file content is good for a workout, a shopping mall, a dinner party, a dance party, slow dancing or studying.

(e) Ensemble vector values indicating whether the audio file includes a female solo, male solo, female duet, male duet, mixed duet, female group, male group or instrumental.

(f) Genre vector values that indicate whether the audio file content belongs to a plurality of genres including Alternative, Blues, Country, Electronics/Dance, Folk, Gospel, Jazz, Latin, New Age, Rhythm and Blues (R and B), Soul, Rap, Hip-Hop, Reggae, Rock and others.

(g) Instrument vectors that indicate whether the audio file content includes an acoustic guitar, electric guitar, bass, drum, harmonica, organ, piano, synthesizer, horn or saxophone.

If the input audio file matches a provisional rating, then in step S708, the process converts the provisional rating to a confirmed rating.

Figure 8:
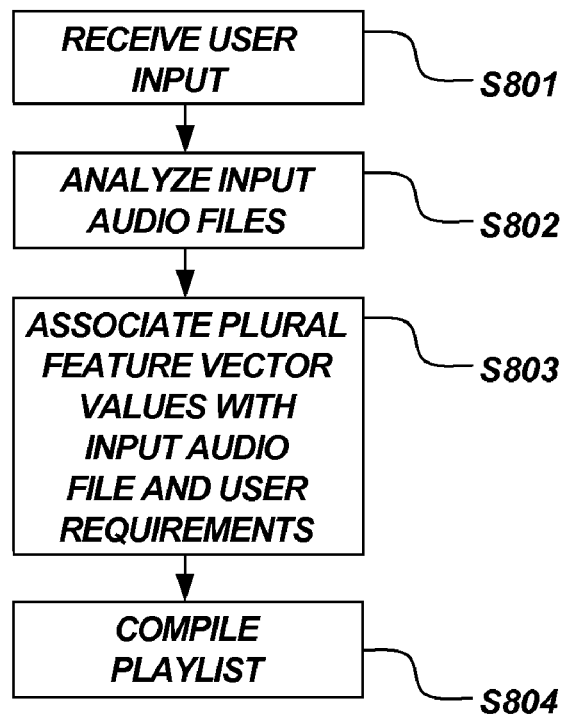
FIG. 8 is a flow diagram of computer executable process steps of generating a playlist, according to the present invention.

FIG. 8 is a flow diagram of computer executable process steps for generating a customized music list ("playlist") based upon user defined parameters.

In step S801, a music listener inputs a request for a playlist. UI 400A (FIG. 4) may be used by a music listener to input user preferences. UI 400A is described in U.S. patent application Ser. No. 09/533,045, entitled "Method for Creating a Database for Comparing Music Attributes", filed on Mar. 22, 2000, and incorporated herein by reference. A user may request a playlist by specifying emotional quality, voice quality, instrument or genre vector, tempo, artist, album title and year of release, etc.

In step S802, playlist generator 400 scans audio files stored on user's disk 15. One methodology of analyzing audio files is provided above in FIG. 7. Audio files may also be acquired from a remote computer connected to the Internet and analyzed as shown above.

In step S803, Signature Comparator 400C searches for music based upon analyzed audio file data.

In step S804, playlist generator 400 compiles a playlist based upon user preferences and the compared data.

Determining Audio Signatures

Audio signatures identify audio files and are based upon the signal characteristics of a particular audio file sample. If the audio signatures of a group of audio files is known then a new audio file may be compared with the known group of audio signatures. Audio signature is a representation of an audio file that assists in comparing audio samples. Audio signature may be developed for any audio file and whenever two audio samples overlap, the audio signatures of the samples will also overlap. It is this property that assists comparison of audio samples.

Figure 9:
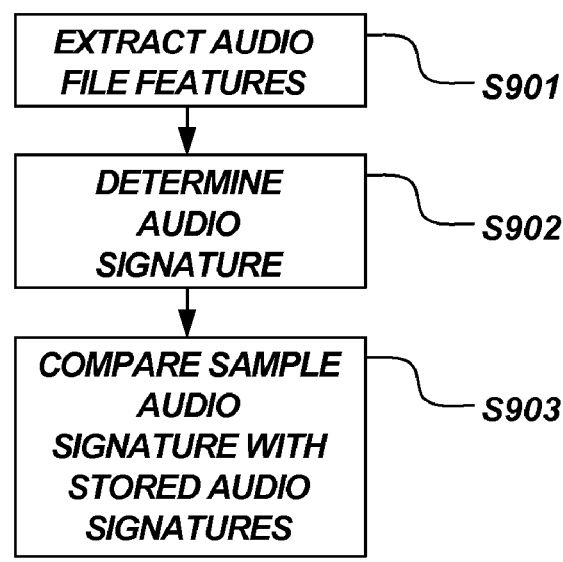
FIG. 9 is a flow diagram of computer executable process steps for determining audio signatures based upon one aspect of the present invention.

FIG. 9 is a flow diagram showing process steps for determining audio signatures according to one aspect of the present invention.

In step S901, an audio sample is represented as a signal. The signal is then used to determine a set of parameters or features that describe the signal. FIG. 6A shows an example of representing an audio file over time.

In step S902, the determined features from step S901 are used to compute an audio signature for the audio sample.

In step S903, the audio signature determined in step S902 is compared to pre-computed audio signatures stored in database 401.

The following describes different techniques under the present invention that may be used to implement the process steps of FIG. 9.

Vector Quantization Methodology

Under this methodology, an audio file is transformed into a raw intensity signal and the transformed signal is used to compute a set of features or parameters. The features are computed from sequential (possibly overlapping) sets of raw intensity signal and transforms the intensity signal into a time series of feature values. This multivariate time series of feature vectors is then compressed into a 1-dimensional vector of elements. This compression is achieved using vector quantization of the multivariate features, so that each point in the feature space can be mapped onto an element in a finite code book. Thereafter, the computed 1-dimensional vector (1-d string) is matched against known values stored in a database using fast string matching algorithms to retrieve a match.

Pre-Processing

As discussed in step S901, pre-processing is used to convert an audio file whose signature is to be calculated, to a standard reference format. More specifically mono audio files of 16-bit samples at 22050 Hz sampling rate are used as a reference format. Standard commercially available software converters and decoders may be used for this purpose. More specifically Sox sound converting utility that can be downloaded from the Internet address www.spies.com/Sox/ and Xaudio mp3 decoder downloaded from a website located at www.xaudio.com may be used.

Feature Extraction

As discussed in step S901, certain features or parameters are extracted from an audio file signal. The features of this methodology are based on Short Time Fourier Transform (STFT) analysis. The STFT is a signal processing analysis technique that processes audio file signals in samples designated as bins or windows (FIG. 6A) and then a Discrete Fourier Transform (DFT) is determined for the bins or windows. This technique is disclosed in A. V. Oppenheim and A. S. Wilsky (1997) Signals and Systems (2nd Ed.) Prentice-Hall, which is herein incorporated by reference in its entirety for all purposes. The signal consists of a time series of values. The time series is divided into smaller units or bins (that may be overlapping). The STFT and related features are computed on each of these bins. Thus the original signal time series is transformed into a vector time series of features.

It is noteworthy that because overall level (volume) effects vary across different encodings of the same audio file and can not be assumed to be uniform, STFT features are normalized to eliminate level (volume) effects by dividing out the dc component of the STFT at each sample point before further processing The following STFT-based features may be extracted in step S901:

Spectral Centroid is the balancing point of the spectrum (The spectrum is the representation of audio intensity over time. (FIG. 6A)) magnitude and is defined as:

$$C = \Sigma i * M_i \text{ where } i = 1, 2, \ldots, N$$
$$\Sigma M_i$$

where N is the FFT window size and the Mi's are the frequency bins of the spectrum magnitude.

Spectral Rolloff like the spectral centroid is another measure of the shape of the spectrum. It is defined as:

$$R = r \text{ such that } \Sigma_1^r M_i = 0.8 * \Sigma_r^N M_i$$

where N is the FFT window size, the M_i's are the frequency bins of the spectrum magnitude.

Spectral Flux is the 2-norm of the difference between the magnitude of the short time Fourier transform (STFT) spectrum evaluated at two successive analysis windows. Note that the signal is first normalized for energy, i.e. all segments on which the STFT is calculated are constrained to have equal energy (the same dc value of the STFT).

Peak ratio is the ratio of the magnitude of the highest peak in the magnitude spectrum to the average magnitude.

Subband energy vector is a vector of sub-band energies calculated by grouping STFT frequency bins to logarithmically spaced sub-bands. The STFT is normalized in energy.

Subband flux is the 2-norm of the difference between the subband energy vectors evaluated at two successively analyzed windows.

Subband Energy Ratios are formed by analyzing the energy component of the signal in each of a defined set of frequency bands. The ratios of the energy in these sub-bands provide a set of measures of the spectral composition of the signal. For example, if energies in 5 sub-bands are determined then there are 10 (5 choose 2) distinct ratios between the 5 sub-bands. These 10 numbers define a vector, which characterizes the spectral energy distribution. A related set of statistics that may be used is the logarithmic ratios of the sub-band energies. The logarithmic ratios make the numbers more stable and robust.

Signature Calculation (Step S902, FIG. 9)

Vector Quantization

Figure 10A:
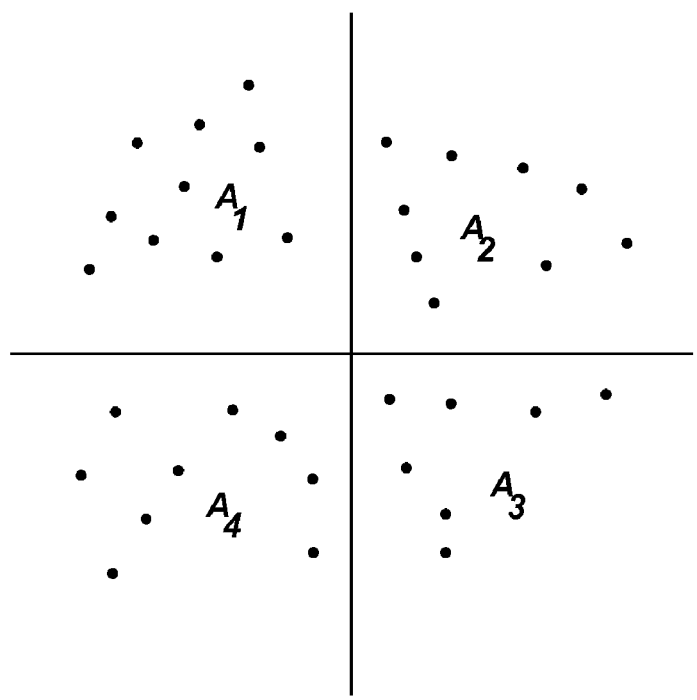
FIG. 10A shows a set of representative points randomly scattered and used for vector quantization, according to another aspect of the present invention.

Feature extraction in step S901 provides a time series of feature vectors. Vector Quantization (VQ) is a technique that maps a large set of vectors to a smaller representative indexed set of vectors (code words) designated as the code-book. VQ is used to compress vector information. VQ reduces multidimensional vectors comprising of the computed features onto a single value. FIG. 10A is a flow diagram showing computer executable process steps to perform VQ, according to one aspect of the present invention.

Figure 10B:
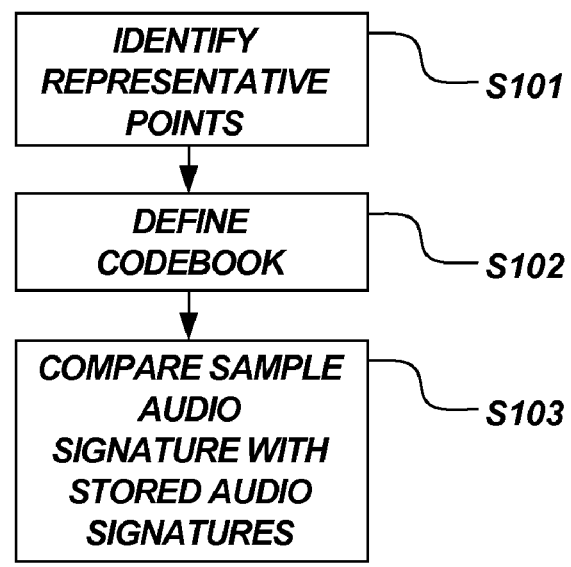
FIG. 10B is a flow diagram of computer executable process steps for performing vector quantization, according to another aspect of the present invention.

In step S101, identify a set of representative points. FIG. 10B shows a distribution of a set of points. Each point may include a plurality of features defined above. Generally, the representative points are based upon music samples across many genres of music. The representative points specify location in a multidimensional feature space. After identifying a set of representative points, a c-means clustering algorithm is applied to the data set. The c-means clustering algorithm determines a set of cluster centers (A1, A2, A3 and A4 in FIG. 10B). 20 and 40 cluster centers may be used for a 5-10 dimensional feature space. The invention is not limited to any particular numbers of cluster centers. The iterative c-means algorithm based upon relative Mahalonobis distance determines the cluster centers. Details of the foregoing techniques are provided in "Multivariate Observations" by G. A. F. Seber, (1984), published by John Wiley & Sons, incorporated herein by reference in its entirety.

In step S102, the process defines a code-book and each of the representative points derived in step S101 above is mapped to an element in the code book, where each element corresponds to a unique ASCII character.

In step S103, the process defines a rule that can map any point in a feature space onto an element of the codebook. Cluster centers are assigned to the elements of the codebook. Points that are not cluster centers are mapped to a cluster center, and then assigned to an element of the codebook corresponding to that cluster center. To map an arbitrary point onto a cluster center Mahalonobis distance metric and a nearest neighbor algorithm is used. Every point is mapped onto the closest cluster center, using a Mahalonobis distance or a similar metric.

VQ provides a string of characters. These characters may be compressed by using a logarithmic run length compression scheme. In this scheme a run of the same character is compressed to a shorter run with length equal to the logarithm of the original run length. For example, the string of characters aaaabccccccccc will be compressed to aabccc ($Log_2 8 = 3$ so the 8 c's are compressed to 3). The compressed string provides compact audio signatures that can be efficiently transmitted and compared. Also, logarithmic run length compression highlights the regions when the signal is changing.

Base Overshifting

The process described above depends upon STFT which in turn depends on the bin or window size of the signal. In particular, to compute STFT efficiently, the raw audio signal is partitioned into bins of a certain size (for example bins size 512 of sample points). However, where the bins should start and end affects the accuracy of the computed audio signature. For example, if a raw signal has 10,000 points and the signal is divided into bins of length 512, the computation could start at the beginning of every 512 points or the computation could start at the second, or tenth, or hundredth point etc. Since not every audio sample starts at the "beginning" of some canonical version of the exact choice of bins or windows the signature extraction procedure should be robust to average out the arbitrariness in the computation.

The present solution provides a solution to the arbitrariness of bin selection by choosing features that are intrinsically robust to shifts in binning. Also, multiple signatures may be computed for each audio sample based on different bin shifts. For example, one signature is computed based on starting the first bin at the beginning of the audio file. A second signature is then computed based on bins starting at the Nth data point. A third signature might be computed based on the first bin starting at the N+Kth data point and so on. Plural number of shifted audio signatures is computed for each audio sample. Each audio signature is a short list of strings (typically of length 8 or 16) where each string corresponds to a slightly shifted bin analysis.

Audio signatures determined by the foregoing process allow signature comparison of new audio samples (query signature) with stored pre-computed audio signatures (base signature) (FIG. 7, step S704). In order to compare a query signature with a base signature, the query signature is divided into overlapping sub-strings. The sub-strings are then compared to the base signature. The following example illustrates the matching process.

Assume that a query signature is denoted as AAB-BCADAABC . . .

The above signature is broken into sub-strings of defined length (e.g. 11 characters). The sub-string of 11 characters is then compared to the stored base signature stored in central database 401.

Hierarchical matching may also be used to obtain the best match. In this process a sub-string of X characters is used and thereafter, a subset of the sub-string comprised of X' characters where X' is less than X is used to match a query signature with the base algorithm. A specific confidence level or value may be assigned to a match for each sub-string. A match index value may be used to enhance the accuracy of matching where match index value is given by:

$$MI = \Sigma Wi * Ni$$

Where Wi is a weight (real number) for matches of length i and Ni is the number of substring matches of length i. Thus, Match Index (MI) is a weighted sum of the number of substring matches of different length substrings. Matches for longer substrings are less likely by chance and should thus be assigned a higher weight than matches of shorter length. Thus, the magnitude of the weight Wi is a measure of the confidence assigned to matches of a given substring length.

The foregoing process can be iterated to improve performance. For example, after a particular codebook is defined to match a small set of characters out of a large set, the process may define a second codebook for the subset of songs matched with the first codebook to expedite matching. Alternatively, many independent codebooks may be defined and used in conjunction. The best matching songs will match across the most codebooks. The advantage of this approach is that errors in matching in one codebook will be compensated for by matches in another codebook.

The following specific values may be used for the foregoing process:

sampling_rate=22050 Hz sample size (bits)=16 fft_size=512 window_size 512 code_book_size=14 overshifting=8 query substring length=14 query overlap=13

It is noteworthy that the foregoing values are merely to illustrate the foregoing process and is not to limit the invention.

Segmentation Technique

Another method for determining audio signatures according to the present invention involves the following: 1) an audio sample is segmented into disjoint, contiguous regions in a robust and deterministic manner, 2) a robust description of the audio characteristics of each segment is determined. This description may be any parameterization of the audio file, or may consist of nonparametric samples, and 3) an audio signature is developed which reflects the segmentation structure of the original audio sample. One method to determine audio for segmenting audio files is described in an article "Multifeature Audio Segmentation for Browsing and Annotation", by George Tzanetakis, one of the present inventors, and Perry Cook ("Tzanetakis and Cook"), published Oct. 17-20, 1999, in "IEEE Workshop on Applications of Signal Processing to Audio and Acoustics", incorporated herein by reference in its entirety.

Figure 10C:
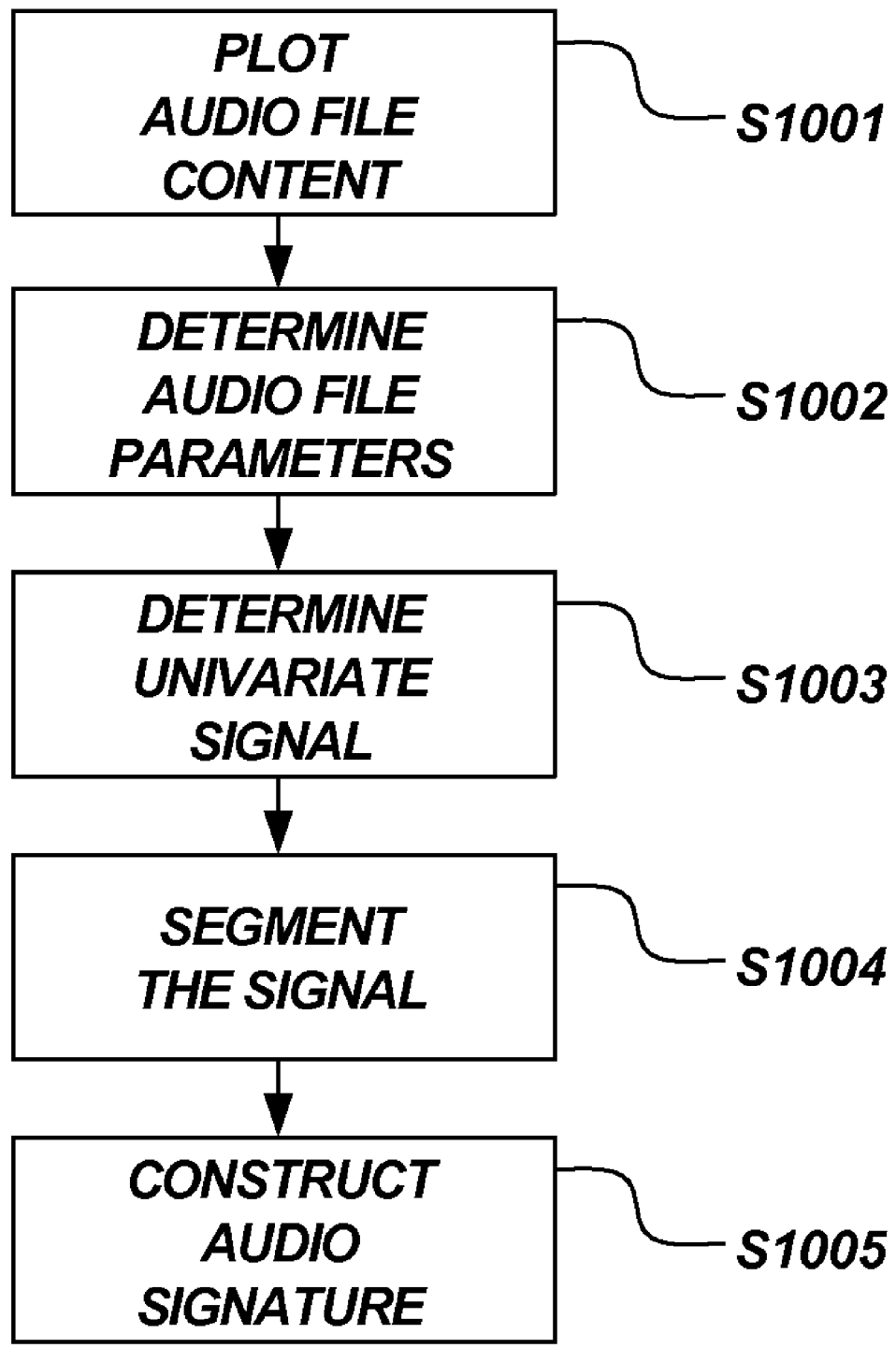
FIG. 10C is a flow diagram of computer executable process steps for determining audio signatures, according to yet another aspect of the present invention.

FIG. 10C is a flow diagram of process steps to implement the Segmentation techniques.

In step S1001, an input audio file's content is plotted over time. FIG. 6A shows an audio sample where audio intensity (Ia) is plotted against time.

In step S1002, the process determines audio sample feature vectors or parameters. A set of parameters for Ia is computed for a set of short contiguous bins (or short overlapping bins). Hence, Ia is transformed into a set of parametric descriptions (over time), designated for the purpose of illustration as Pa1, Pa2, . . . , PaN, for N parameterizations. Pa1, Pa2, . . . , PaN, is a time series of feature vectors that describe the audio file intensity Ia. Examples of such parameters are described above under vector quantization methodology and also include the following:

(a) Zero Crossings: Number of time domain zero crossings, i.e, the number of times the signal intensity changes from positive to negative or negative to positive in the sample file.

(b) Root Mean Square (RMS) energy (intensity) within a given bin.

(c) Nth percentile frequency of the spectrum (e.g., N=25, 50, 75, etc)

The Nth percentile frequency of the spectrum of a specific bin is the largest frequency fk such that Sum(Ai)/Sum(Aj)<=N*100 where i=1,2, . . . , fk and j=1,2, . . . , fM where fM is the highest sample frequency.

(h) Spectral energy correlation of contiguous bins (the correlation between bins i and i+N (where N is a positive integer representing the correlation lag computed for the spectral energy across frequencies).

The foregoing list of parameters is not exhaustive. Other mathematical variables may also be used to determine audio file vectors.

In step S1003, the process determines a univariate signal based upon the foregoing audio file parameters. Pa1, Pa2, . . . , PaN of Ia, are combined into a single, univariate signal dt. One method to compute dt is to compute the distance between successive time frames of the feature vector of parameterizations. Various distance metrics may be used as discussed in Tzanetakis and Cook. Mahalonobis distance is one such metric and is used between successive values of feature vectors Pa1, Pa2, . . . , PaN. Other distance metrics, such as, Minkowski metrics, may also be used.

An example of determining $d_t$ is provided below. Assume that t1 and t2 are adjacent bins of Ia which have parameterization feature vectors V1 and V2 respectively.

Hence, V1=[Pa1$_1$ Pa2$_1$ . . . PaN$_1$] and V2=[Pa1$_1$ Pa2$_1$ . . . PaN$_1$].

$d_t = \|V_2 - V_1\|$ where $\| \|$ indicates computation of the Mahalonobis distance between V1 and V2.

Thereafter $\Delta_{ti}$ is determined by $\|V_t - V_{t-1}\|$ for all adjacent bins.

After determining the univariate distance signal $\Delta_t$, in step S1004, the process segments the audio sample. Regions of high change in the signal define segmentation. A derivative, $\delta\Delta_t/\delta t$ is computed and compared to a predefined threshold value. Points at which the derivative value is greater than the threshold value indicate sudden transitions in the audio signal and define segmentation points.

In step S1005, the audio signature for a sample audio file is determined, as illustrated by the following example.

For a given audio sample S, segment points are determined at $t1, t2, \ldots, tN$ using the procedure described above. A set of $N-1$ segments may then be constructed, having lengths $L1, L2, \ldots, LN-1$ where $Lk=tk+1-tk$ and $tk$ is the time point (in the sample) of the kth segment. For each audio segment a set of robust statistics are computed. Numerous statistical values may be used to define and describe specific segments for example, spectral centroid, spectral rolloff, intensity variance, skewness, kurtosis, and sub-band energy ratios etc.

Hence, having determined a set of audio segments $L1, L2 \ldots, LM$ and a set of k robust statistics for each segment $R11, R12, \ldots, R1k$, an audio signature, ("AS") may be determined as follows:

$$AS=[L1\ R11\ R12 \ldots R1k\ L2\ R21\ R22 \ldots R2k \ldots LM\ RM1\ RM2 \ldots RMk]$$

AS is a vector or string which concatenates the segment length and robust summary for each of the segments.

It is noteworthy that AS is definable for any audio sample of sufficient length to contain at least 1 segment, and if two different audio samples contain overlapping audio segments, then the audio signatures contain overlapping elements.

It is noteworthy that instead of segmenting an audio file into variable length segments as described above, the audio file is first segmented into fixed-length segments, and then robust statistics are calculated within each segment.

It is also noteworthy that any or all of these techniques described above may be combined in a multistage procedure.

One advantage of the foregoing aspects of the present invention is that unique audio signatures may be assigned to audio files. Also various attributes may be tagged to audio files. The present invention can generate a customized playlist for a user based upon audio file content and the attached attributes, hence making the music listening experiences easy and customized.

Although the present invention has been described with reference to specific embodiments, these embodiments are illustrative only and not limiting. Many other applications and embodiments of the present invention will be apparent in light of this disclosure and the following claims.

The invention claimed is:

1. A method for generating a fingerprint of an audio waveform, comprising:
   defining a codebook which represents a multivariate vector of one or more spectral features with one of a plurality of codes, each code corresponding to a bin and representing a portion of a predetermined audio waveform;
   dividing the audio waveform into a plurality of bins,
   for each bin of the plurality of bins, computing one or more spectral features for the bin,
   wherein the computing comprises:
   (a) computing the one or more spectral features for a first group of data points within the bin;
   (b) shifting some number of data points within the bin; and
   (c) computing the one or more spectral features for a second group of data points within the bin;
   mapping the one or more spectral features obtained by the computing to a string of codes from the codebook;
   generating a fingerprint by representing the audio waveform with the string of codes obtained by the mapping; and
   aligning the string of codes in a time series.

2. The method of claim 1, wherein one or more data points in the first group overlap with one or more data points in the second group.

3. The method of claim 1, wherein each code is a hash code.

4. The method of claim 1, further comprising:
   compressing the string of codes from the codebook to form a compressed string, wherein the codes of the compressed string are aligned in a time series.

5. A method for creating a signature of an audio waveform, comprising:
   dividing the audio waveform into a plurality of bins;
   for the plurality of the bins, selecting a first group of data points within each bin, and computing one or more spectral features for each bin based upon the first group of points within the plurality of bins,
   and for the plurality of bins, selecting a second group of data points within each bin, and computing one or more spectral features for each bin based upon the second set of data points within the bins of the plurality;
   mapping the one or more spectral properties for the plurality of bins to a string of codes by referencing a codebook of multivariate vectors; and
   creating one or more signatures representing the audio waveform with the string of codes obtained by the mapping.

6. The method of claim 5, wherein each code in the string represents the waveform over a portion of the waveform, and wherein the codes are aligned in a time series.

7. The method of claim 6, further comprising:
   compressing the string such that the time series alignment is maintained.

8. The method of claim 5, further comprising:
   comparing a signature of the one or more signatures that initiates at a given time with a representation of an audio segment.

9. The method of claim 8, further comprising:
   defining a codebook which represents a vector of one or more spectral features with a code, prior to referencing said codebook.

10. The method of claim 5, wherein one or more signatures is created for each bin.

11. A method for creating a signature for an audio waveform, comprising:
    dividing the audio waveform into a plurality of bins;
    for the plurality of the bins, selecting a first group of data points within each bin, and computing one or more spectral properties for each bin based upon the first group of points within the plurality of bins,
    and for the plurality of bins, selecting a second group of data points within each bin, and computing one or more spectral properties for each bin based upon the second set of data points within the plurality of bins;
    mapping the one or more spectral properties for the plurality of bins to a string of hash codes by referencing a codebook of hash values representing a multivariate vector; and
    creating one or more signatures representing the audio waveform with the string of hash values obtained by the mapping.

12. The method of claim 11, wherein each code is a hash code.

13. A computer-readable memory medium having computer-executable code stored therein for causing a computer to generate a fingerprint of an audio waveform, said computer-executable code comprising:
    code for causing the computer to define a codebook which represents a multivariate vector of one or more spectral features with one of a plurality of codes, each code corresponding to a bin and representing a portion of a predetermined audio waveform;

code for causing the computer to divide the audio waveform into a plurality of bins;

code for causing the computer to compute one or more spectral features for a first group of data points within each bin of the plurality of bins;

code for causing the computer to shift some number of data points within each bin of the plurality of bins; and code for causing the computer to compute one or more spectral features for a second group of data points within each bin of the plurality of bins;

code for causing the computer to map the one or more spectral features obtained by the computing to a string of codes from the codebook;

code for causing the computer to generate a fingerprint by representing the audio waveform with the string of codes; and code for causing the computer to align the string of codes in a time series.

14. The memory medium of claim 13, wherein one or more data points in the first group overlap with one or more data points in the second group.

15. The memory medium of claim 13, wherein each code is a hash code.

16. The memory medium of claim 13, wherein said computer-executable code, further comprises:

code for causing the computer to compress the string of codes from the codebook to form a compressed string, wherein the codes of the compressed string are aligned in a time series.

17. An apparatus for fingerprinting an audio waveform, comprising:

means for defining a codebook which represents a multivariate vector of one or more spectral features with one of a plurality of codes, each code corresponding to a bin and representing a portion of a predetermined audio waveform;

means for dividing the audio waveform into a plurality of bins;

means for computing one or more spectral features for a first group of data points within each bin of the plurality of bins;

means for shifting some number of data points within each bin of the plurality of bins; and means for computing one or more spectral features for a second group of data points within each bin of the plurality of bins;

means for mapping the one or more spectral features for the first and second groups of data points obtained by the means for computing to a string of codes from the codebook;

means for generating a fingerprint by representing the audio waveform with the string of codes obtained by the mapping; and means for aligning the string of codes in a time series.

18. A computer-readable memory medium having computer-executable code stored therein for causing a computer to create a signature of an audio waveform, said computer-executable code comprising:

code for causing the computer to divide the audio waveform into a plurality of bins;

code for causing the computer to select a first group of data points within each bin;

code for causing the computer to compute one or more spectral features for each bin based upon the first group of points within the plurality of bins;

code for causing the computer to select a second group of data points within each bin;

code for causing the computer to compute one or more spectral features for each bin based upon the second set of data points within the bins of the plurality;

code for causing the computer to map the one or more spectral features for the plurality of bins to a string of codes by referencing a codebook representing at least one multivariate vector; and code for causing the computer to create one or more signatures representing the audio waveform with the string of codes.

19. The memory medium of claim 18, wherein each code in the string represents the waveform over a portion of the waveform, and wherein the codes are aligned in a time series.

20. The memory medium of claim 19, wherein said computer-executable code further comprises:

code for causing the computer to compress the string such that the time series alignment is maintained.

21. The memory medium of claim 19, wherein said computer-executable code further comprises:

code for causing the computer to compare a signature of the one or more signatures that initiates at a given time with a representation of an audio segment.

22. The memory medium of claim 21, wherein said computer-executable code further comprises:

code for causing the computer to define a codebook which represents a vector of one or more spectral features with a code, prior to referencing said codebook.

23. The memory medium of claim 18, wherein one or more signatures is created for each bin.

24. The memory medium of claim 18, wherein each code is a hash code.

25. An apparatus for creating a signature of an audio waveform, comprising:

means for dividing the audio waveform into a plurality of bins;

means for selecting a first group of data points within each bin;

means for computing one or more spectral features for each bin based upon the first group of points within the plurality of bins;

means for selecting a second group of data points within each bin;

means for computing one or more spectral features for each bin based upon the second set of data points within the bins of the plurality;

means for mapping the one or more spectral features for the plurality of bins to a string of codes by referencing a codebook, wherein the codebook represents at least one multivariate vector; and means for creating one or more signatures representing the audio waveform with the string of codes.

26. A method for fingerprinting an audio waveform, comprising:

defining a codebook which represents a multivariate vector of one or more spectral features with a corresponding one of a plurality of codes;

dividing the audio waveform into a plurality of bins;

computing one or more spectral features for each bin; and generating a fingerprint by mapping the one ore more spectral features to a string of codes from the codebook to represent the audio waveform based on the computed one or more spectral features for each bin.

27. A computer-readable memory medium having computer-executable code stored therein for causing a computer to create a signature of an audio waveform, said computer-executable code comprising:
- code for causing the computer to define a codebook which represents a multivariate vector of one or more spectral features with a corresponding one of a plurality of codes;
- code for causing the computer to divide the audio waveform into a plurality of bins;
- code for causing the computer to compute one or more spectral features for each bin; and
- code for causing the computer to map the one ore more spectral features to a string of codes from the codebook to generate a fingerprint representing the audio waveform based on the computed one or more spectral features for each bin.

28. An apparatus for fingerprinting an audio waveform, comprising:
- means for defining a codebook which represents a multivariate vector of one or more spectral features with a corresponding one of a plurality of codes;
- means for dividing the audio waveform into a plurality of bins;
- means for computing one or more spectral features for each bin;
- means for mapping the one ore more spectral features to a string of codes from the codebook; and
- generating a fingerprint by representing the audio waveform with the string of codes.

* * * * *

UNITED STATES PATENT AND TRADEMARK OFFICE
CERTIFICATE OF CORRECTION

| | |
|---|---|
| PATENT NO. | : 7,853,344 B2 |
| APPLICATION NO. | : 11/839768 |
| DATED | : December 14, 2010 |
| INVENTOR(S) | : Rehan M. Khan et al. |

It is certified that error appears in the above-identified patent and that said Letters Patent is hereby corrected as shown below:

[54] TITLE

"DITIGAL" should read --DIGITAL--.

[56] REFERENCES CITED

Other Publications
Under U.S. District Court, "Gracenot" should read --Gracenote--.

COLUMN 1

Line 2, "DITIGAL" should read --DIGITAL--.

COLUMN 5

Line 5, "Portable" should read --portable--.

COLUMN 7

Line 16, "Sad" should read --Sad,--.
Line 21, "indicates" should read --indicate--.

COLUMN 9

Line 4, "processing" should read --processing.--.

COLUMN 11

Line 53, "is" should read --are--.

Signed and Sealed this
Twenty-first Day of June, 2011

David J. Kappos
*Director of the United States Patent and Trademark Office*

COLUMN 15

Line 10, "and" should be deleted.
Line 28, "code," should read --code--.
Line 47, "and" should be deleted.

COLUMN 16

Line 64, "ore" should read --or--.

COLUMN 17

Line 12, "ore" should read --or--.

COLUMN 18

Line 10, "ore" should read --or--.